United States Patent
Hagiuda et al.

(10) Patent No.: US 6,614,999 B2
(45) Date of Patent: Sep. 2, 2003

(54) DETACHABLE FLASH DEVICE FOR CAMERA

(75) Inventors: Nobuyoshi Hagiuda, Yokohama (JP); Hideki Matsui, Fujisawa (JP); Zhaoxiang Chen, Kawasaki (JP)

(73) Assignee: Nikon Corporation, Tokyo (JP)

( * ) Notice: Subject to any disclaimer, the term of this patent is extended or adjusted under 35 U.S.C. 154(b) by 0 days.

(21) Appl. No.: 09/948,767

(22) Filed: Sep. 10, 2001

(65) Prior Publication Data

US 2002/0039490 A1 Apr. 4, 2002

(30) Foreign Application Priority Data

Sep. 11, 2000 (JP) ........................................ 2000-274397

(51) Int. Cl.⁷ ........................ G03B 15/03; G03B 15/06; G03B 11/00
(52) U.S. Cl. ........................ 396/155; 396/164; 396/174; 396/176; 396/544
(58) Field of Search ................................ 396/155, 164, 396/171, 174, 175, 182, 176, 177, 178, 544, 545, 179

(56) References Cited

U.S. PATENT DOCUMENTS

| | | | |
|---|---|---|---|
| 4,360,764 A | | 11/1982 | Yagi |
| 4,910,542 A | * | 3/1990 | Yamamoto et al. ......... 361/699 |
| 4,983,998 A | * | 1/1991 | Hirohata et al. ............ 396/175 |
| 5,164,759 A | * | 11/1992 | Yasukawa ................... 396/157 |
| 5,202,719 A | * | 4/1993 | Taniguchi et al. .......... 396/176 |
| 5,565,941 A | * | 10/1996 | Kaneko ....................... 396/155 |
| 6,233,404 B1 | * | 5/2001 | Tobise et al. ............... 396/164 |
| 2002/0015590 A1 | * | 8/2001 | Chen et al. ................. 396/182 |

FOREIGN PATENT DOCUMENTS

| | | |
|---|---|---|
| JP | 57-122423 | 7/1982 |
| JP | 58-113919 | 7/1983 |
| JP | 9-15689 | 1/1997 |
| JP | Hei 9-15689 | * 1/1997 |

* cited by examiner

*Primary Examiner*—Russell Adams
*Assistant Examiner*—Andrew Sever
(74) *Attorney, Agent, or Firm*—Oliff & Berridge, PLC

(57) ABSTRACT

A dimming plate for dimming light from an internal flash device of a camera, is disposed on the external flash device of the present invention which is mounted for use on a mounting seat of the camera. A two-lamp-lighting photographing is carried out in a state where the light from the internal flash device of the camera is dimmed by covering a luminescent unit of the internal flash device with the dimming plate of the external flash device. Thereby the two-lamp-lighting photographing can be carried out easily and reliably, where the light emission of the external flash device is used as a main light source, and the light emission of the internal flash device of the camera as a supplementary light source. The external flash device becomes inexpensive because the two-lamp-lighting photographing can be carried out only by incorporating the dimming plate therein without a special sub-luminescent unit disposed.

11 Claims, 15 Drawing Sheets

DETACHABLE FLASH DEVICE FOR CAMERA

BACKGROUND OF THE INVENTION

1. Field of the Invention

The present invention relates to an external flash device for a camera, in particular, to an external flash device which is mounted for use on a mounting seat of a camera provided with an internal flash device.

2. Description of the Related Art

Generally, photographing using an electric flash device has a drawback that it gives an unnatural picture without shadows because the electric flash device mounted on a camera illuminates the subject from a position in front of it.

Conventionally, for resolving the above problem, a bounce lighting using a so-called two-lamp flash is known as disclosed in Japanese Unexamined Patent Application Publication No. Sho 58-113919, Japanese Examined Patent Application Publication No. Sho 59-47440, and so forth, in which a two-lamp flash device is used, that is, a main luminescent unit having a larger light amount illuminates a ceiling, the reflected light from which mainly illuminates a subject from above, while the other sub-luminescent unit having a smaller light amount directly illuminates the subject.

When this method is used, the bounce light makes natural shadows in the lower area and the direct illumination light from the sub-luminescent unit adequately illuminates the shadow area where gradation is lost. Therefore, the method is effective especially for portrait photographing because natural shadows are made and catchlights are made in the eyes of a person by the direct illumination.

There is another conventional problem that, when a close-up photographing is carried out with a flash device mounted on a camera, the subject is illuminated by an insufficient amount of light and the lighting causes an uneven illumination because of a parallax between a photographing lens and a light emitting window of the flash device.

Conventionally, methods for resolving such problems described above are disclosed in Japanese Unexamined Patent Application Publication Nos. Sho 57-122423, and Hei 9-15689 which was previously filed by the inventor of the present invention, and so forth.

However, providing two luminescent units for a flash device, as disclosed in Japanese Unexamined Patent Application Publication No. Sho 58-113919, Japanese Examined Patent Application Publication No. Sho 59-47440, and so forth, has a problem that the flash device becomes large and expensive.

Moreover, since it is not that a natural lighting is obtained by simply illuminating the subject with a bounce light and a direct light from in front of the subject, an additional change is added to reduce the direct front illumination relatively to the bounce light as shown in, for example, Japanese Examined Patent Application Publication No. Sho 59-47440 in which the direct front illumination is effectively reduced by delaying the start of the emission.

The flash device disclosed in Japanese Unexamined Patent Application Publication No. Sho 57-122423 is a flash device which automatically adjusts the luminescent unit thereof to the optical axis according to a shooting distance, but it has a problem that it requires the camera and the photographing lens having a distance measuring function, and therefore the method is not useable for a camera which does not have the function.

Furthermore, in a case of the close-up photographing at an extremely short distance, if a subject is illuminated by the light from the flash device without dimming, a problem frequently occurs that too large an F-value (too small aperture stop), which is not provided for the photographing lens, is required for the lens to obtain an appropriate exposure.

On the other hand, in a flash device disclosed in Japanese Unexamined Patent Application Publication No. Hei 9-15689, since a method is provided to dim the light from the flash device for the close-up photographing, the problem, that too large an F-value is required which is not available with the photographing lens, does not occur.

However, the flash device disclosed in the patent laid-open is only realized by a flash device whose luminescent unit can rotate horizontally around its leg part inserted and fixed in the camera, and it has such problems that its mechanism is complicated requiring many parts and that the operation is not simple because it accommodates a folded dimming plate (diffusion plate).

SUMMARY OF THE INVENTION

It is an object of the present invention to carry out a two-lamp-lighting photographing easily and reliably, in which the light from an external flash device is used as a main light source and the light from an internal flash device of a camera is used as a supplementary light source.

According to one embodiment of the present invention, a dimming plate for dimming the light from the internal flash device of the camera is disposed on the external flash device which is mounted for use on the mounting seat of the camera. The light from the internal flash device of the camera is dimmed by covering a luminescent unit of the internal flash device of the camera with the dimming plate of the external flash device in order to perform two-lamp-lighting photographing. This enables simple, reliable two-lamp-lighting photographing in which the light emission from the external flash device is a main light source and the light emission from the internal flash device of the camera is a supplementary light source. Further, the external flash device can be provided at inexpensive price because only incorporating the dimming plate therein realizes the two-lamp-lighting photographing without disposing a special supplementary luminescent unit on the external flash device.

According to another embodiment of the present invention, the external flash device has a mounting unit to be mounted on the mounting seat of a camera provided with an internal flash device, a body unit connected with the mounting unit, a luminescent unit connected with the body unit and a dimming plate which is disposed on the body unit and can dim the light of the internal flash device. Then, a two-lamp-lighting photographing is carried out in a state where the light emitted from the internal flash device of the camera is dimmed by covering the luminescent unit of the internal flash device of the camera with the dimming plate disposed on the body unit of the external flash device. This enables easy, reliable two-lamp-lighting photographing where the light emission from the external flash device is used as a main light source and the light emission from the internal flash device of the camera as a supplementary light source. Further, the external flash device can be provided at an inexpensive price because only incorporating the dimming plate in the body unit of the external flash device realizes the two-lamp-lighting photographing.

According to another embodiment of the present invention, the internal flash device of the camera is disposed so as to be able to pop up and the external flash device is mounted on the mounting seat of the camera. The body unit is disposed so as not to get in contact with the internal flash device when the internal flash device pops up from the camera. The internal flash device of the camera is popped up for use, for example, from the top of the camera when the internal flash device is ready to emit light.

The popped-up internal flash device is surely prevented from hitting the external flash device since the body unit of the external flash device is disposed so as not to get in contact with the internal flash device when the internal flash device is ready to emit light.

According to yet another embodiment of the present invention, the dimming plate of the external flash device is disposed at a position changeable relative to the body unit. For example, the dimming plate is pivotally disposed relative to the body unit so that its position is readily and reliably changeable. In this way, the dimming plate can be disposed at a proper predetermined position easily and reliably.

According to yet another embodiment of the present invention, a supporting member is disposed on the body unit of the external flash device in a manner that it can be accommodated in the body unit, and a dimmer plate is disposed at one end of the supporting member. Therefore, the front of the luminescent unit of the external flash device itself can be covered with the dimming plate by, for example, pulling out the supporting member from the body unit.

In yet another embodiment of the present invention, the dimming plate of the external flash device selects either the luminescent unit or the internal flash device and can move to the front of the luminescent unit or of the internal flash device. A two-lamp-lighting photographing is carried out with the dimming plate positioned in front of the internal flash device, by using the light emission from the external flash device as a main light source and the light emission from the internal flash device of the camera as a supplementary light source. Further, the dimming plate is positioned in front of the luminescent unit of the external flash device to carry out a close-up photographing in which its light intensity is reduced by using only the external flash device. In this way, a close-up photographing in which only the external flash device is used is carried out with easiness and sureness as well as the two-lamp-lighting photographing.

According to yet another embodiment of the present invention, the external flash device has a detecting device for detecting the pop-up of the internal flash device. Therefore, it can detect the pop-up of the internal flash device reliably.

According to yet another embodiment of the present invention, the external flash device has a displaying device which indicates that the internal flash device is in a pop-up state when the detecting device detects the pop-up of the internal flash device. Therefore, by looking at the displaying device, it is possible for users to know easily and reliably that the internal flash device is in the pop-up state. Further, by displaying on the display device whether or not the external flash device is attached to the camera, it is possible to easily and reliably tell users that the camera is in the two-lamp-photographing mode.

According to yet another embodiment of the present invention, the external flash device has a slave device which enables detection of light emission from the internal flash device when the detecting device detects the pop-up of the internal flash device. Therefore, it becomes possible to have the external flash device emit light reliably following the light emission from the internal flash device, so that the two-lamp-lighting photographing can be carried out reliably.

According to yet another embodiment of the present invention, the external flash device has a slave device which detects light emission from the internal flash device or other flash devices. The slave device sets the slave sensitivity at a lower level when the external flash device is mounted on the mounting seat of the camera than when the external flash device is not mounted. In this way, the slave sensitivity is low while the external flash device is mounted on the mounting seat of the camera so that the external flash device is able to reliably emit light following not light emission from other flash devices but only the light emission from the internal flash device. The slave sensitivity is high while the external flash device is not mounted on the mounting seat of the camera so the external flash device can emit light following light emission from a built-in flash device at a distance.

According to yet another embodiment of the present invention, the external flash device has a control member which is controlled to enable or disable slave emission when the external flash device is not mounted on the mounting seat of the camera. By holding the external flash device, for example, with his hand, a photographer can control the control member to enable the slave emission at his own photographing timing when the external flash device is not mounted on the mounting seat of the camera. Therefore, it is possible to surely emit light from the external flash device following not light emission from flash devices of other photographers but only the light emission of the internal flash device.

DESCRIPTION OF THE PREFERRED EMBODIMENTS

The present invention will now be described below in detail with reference to the drawings.

Figure 1:
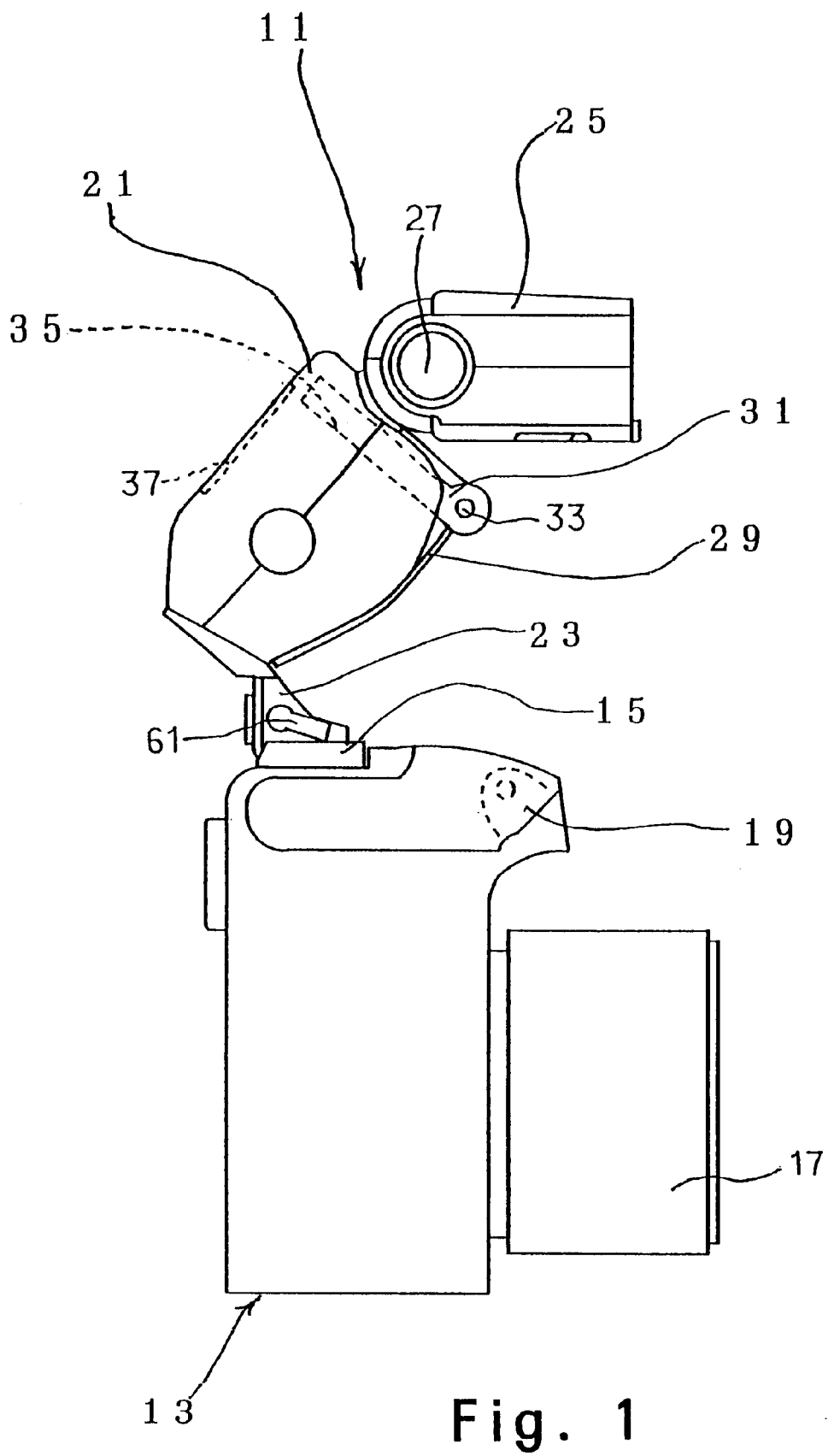
FIG. 1 is a side view showing an embodiment of an external flash device of the present invention.
Figure 2:
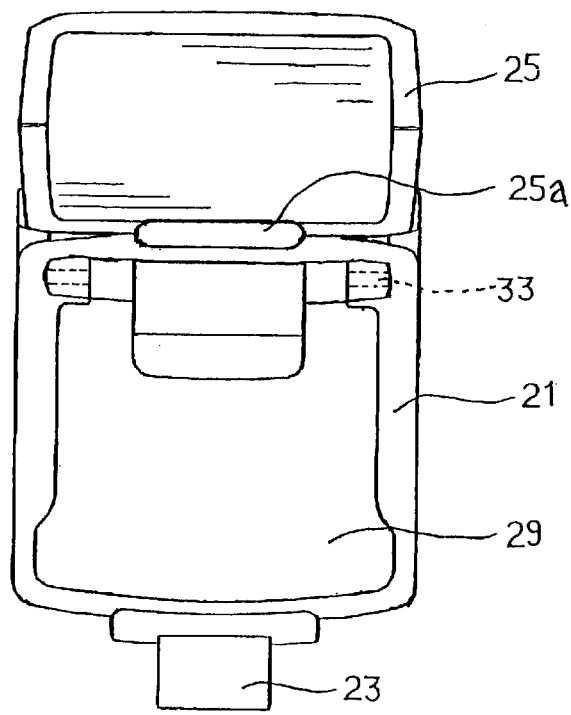
FIG. 2 is a front view showing the external flash device shown in FIG. 1.

FIG. 1 and FIG. 2 show an embodiment of an external flash device of the present invention.

Figure 3:
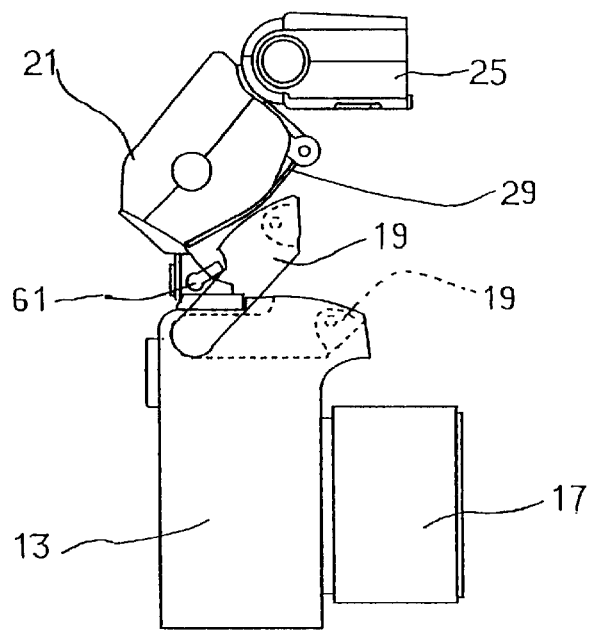
FIG. 3 is a side view showing a state where an internal flash device of a camera is popped up in the external flash device shown in FIG. 1.

In this embodiment, the external flash device 11 is mounted for use on a mounting seat (hot shoe) 15 disposed on the top surface of a camera 13 as shown in FIG. 1. A photographing lens 17 is disposed on the camera 13. In the upper portion of the camera 13, a built-in internal flash device 19 is disposed. The internal flash device 19 is made capable of popping up from the camera 13 as shown in FIG. 3. The internal flash device 19 is enabled to emit light in the pop-up state.

The external flash device 11 has a mounting unit 23 in the lower portion of a body unit 21, which is mounted on a mounting seat 15 of the camera 13. A luminescent unit 25 is disposed in the upper portion of the body unit 21. The luminescent unit 25 is disposed pivotally around an axis part 27 on the body unit 21. A dimming plate 29 is disposed on the front face of the body unit 21. The dimming plate 29 is pivotally supported at an end of a supporting member 31 through an axis part 33. The supporting member 31 is accommodated in an accommodating portion 35 provided in the body unit 21 in an extractable manner.

Figure 4:
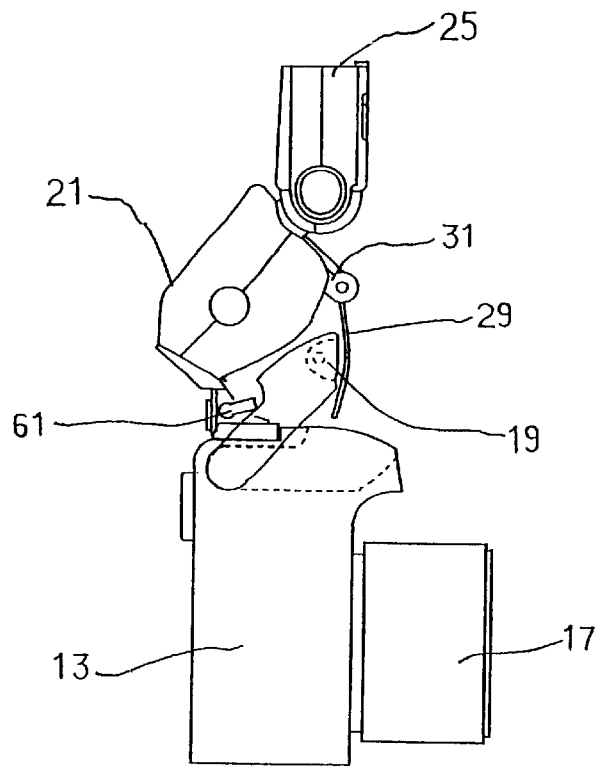
FIG. 4 is a side view showing a state where the internal flash device is covered by a dimming plate of the external flash device shown in FIG. 1.
Figure 5:
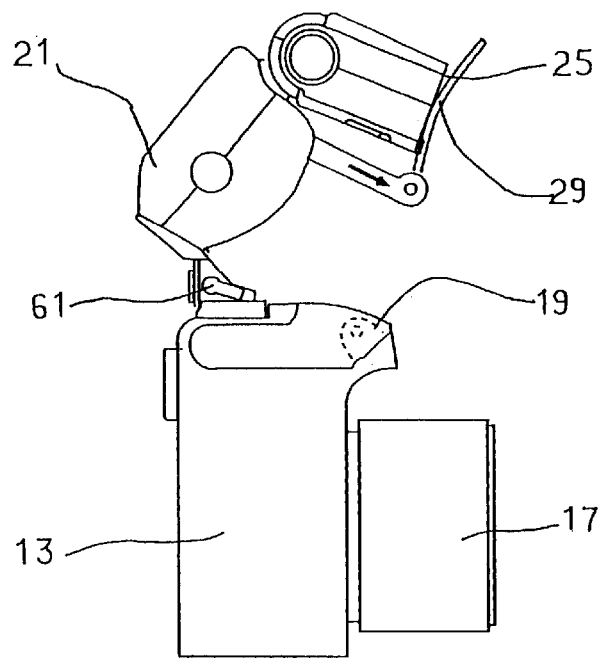
FIG. 5 is a side view showing a state where a luminescent unit is covered by the dimming plate of the external flash device shown in FIG. 1.

Further, the body unit 21, in this embodiment, is disposed in such a manner that it does not touch the internal flash device 19 when the internal device is popped up as shown in FIG. 3. The dimming plate 29 is disposed in such a manner that it can cover the front of the popped-up internal flash device 19 in the state where the supporting member 31 is accommodated in the body unit 21 as shown in FIG. 4. The dimming plate 29 is also disposed in such a manner that it can cover the front of the luminescent unit 25 in the state where the supporting member 31 is extracted from the body unit 21 as shown in FIG. 5.

Further, in this embodiment, an LCD display panel 37 is disposed on the back side (photographer's side) of the body unit 21.

Figure 6:
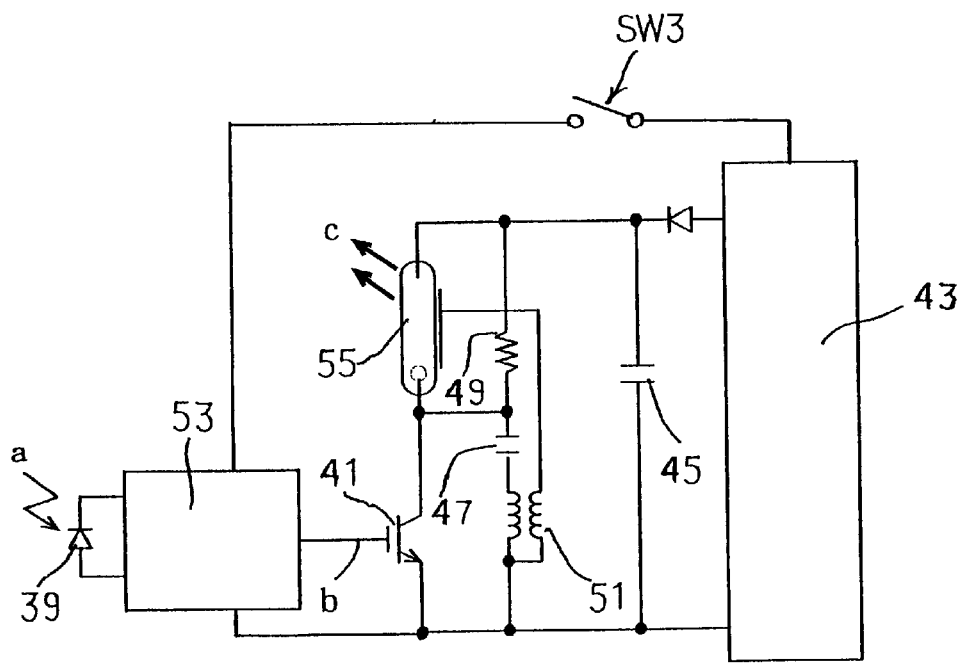
FIG. 6 is a circuit diagram showing an electric circuit of the external flash device shown in FIG. 1.

FIG. 6 is an electric circuit diagram of the external flash device 11 which is a slave circuit disclosed in Japanese Examined Patent Application Publication No. Sho 58-21798, and so forth. A difference from the known art is that, in the present invention, the sensitivity of a sensor 39 is lowered so that it only responds to the internal flash device 19 of the camera 13 while, in the known slave circuit, the sensitivity is raised to respond to light emission of other flash device positioned as distantly as possible therefrom. In this way, the external flash device of the present invention does not erroneously respond to light emission of other flash devices, only responding to the internal flash device 19 of the camera 13.

Figure 7:
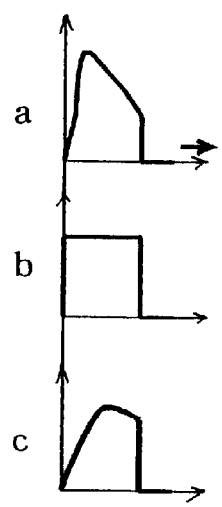
FIG. 7 is an explanatory view showing a waveform of a light emission of the internal flash device, a gate voltage of an IGBT11, a waveform of a light emission of the external flash device.

In FIG. 7, "a" shows a waveform of light emission of the internal flash device 19 of the camera 13, b shows the gate voltage of an IGBT 41 and c shows light emission of the external flash device 11.

In the electric circuit of the external flash device in FIG. 6, a main capacitor 45 is charged beforehand by a power supply 43. A trigger capacitor 47 is charged beforehand through a resistor 49 and a primary coil of a trigger coil 51. When the internal flash device 19 is popped up for use, a detecting lever 61 is operated, a pop-up detecting switch SW3 turns ON, and power is supplied to a circuit 53 which then starts working.

When a flash light "a" from the internal flash device 19 is reflected by the dimming plate 29 and detected by the light sensor 39, the electric circuit 53 turns its output to a high level at the rising of the flash light "a", and turns its output to a low level when the flash light stops, sending the signals to a gate b of the IGBT (insulated-gate bipolar transistor). In the IGBT 41, conduction occurs between the collector and the emitter when the gate b turns to a high level, so that the trigger capacitor 47 is discharged through the collector and the emitter of the IGBT 41, the primary coil of a trigger coil 51 and the capacitor 47.

When the discharging current from the trigger capacitor 47 flows through the primary coil of the trigger coil 51, a high voltage is induced in a secondary coil and is applied to a trigger electrode of a xenon discharge tube 55, which causes the xenon discharge tube 55 to start light emission. Thus, a subject is illuminated by the light from the internal flash device 19 of the camera 13 and the external flash device 11.

The camera 13 measures the light reflected in the subject through a photographing lens 17 and causes the light emission of the internal flash device 19 to stop when the light amount reaches a predetermined level. At this point the light sensor 39 detects the termination of the light emission of the internal flash device 19, and then the gate b of the IGBT 41 turns to a low level changing the IGBT into a nonconductive state, and the light emission of the xenon discharge tube 55 ceases. Thereby the external flash device 11 terminates light emission and the taken picture is properly exposed.

It will now be described below with examples in detail how the external flash device 11 is handled.

(Example of Handling 1)

A conventional photographing is carried out in the state shown in FIG. 1.

In this state, the internal flash device 19 is housed in the camera 13 and the luminescent unit 25 of the external flash device 11 is set to emit illuminating light in a direction parallel to the optical axis of the photographing lens 17. The dimming plate 29 is held at a holding position along the front surface of the body unit 21. The mounting unit 23 of the external flash device 11 is fixed on the mounting seat 15 of the camera 13 so that a usual flash photographing is carried out using the external flash device 11.

(Example of Handling 2)

Figure 8:
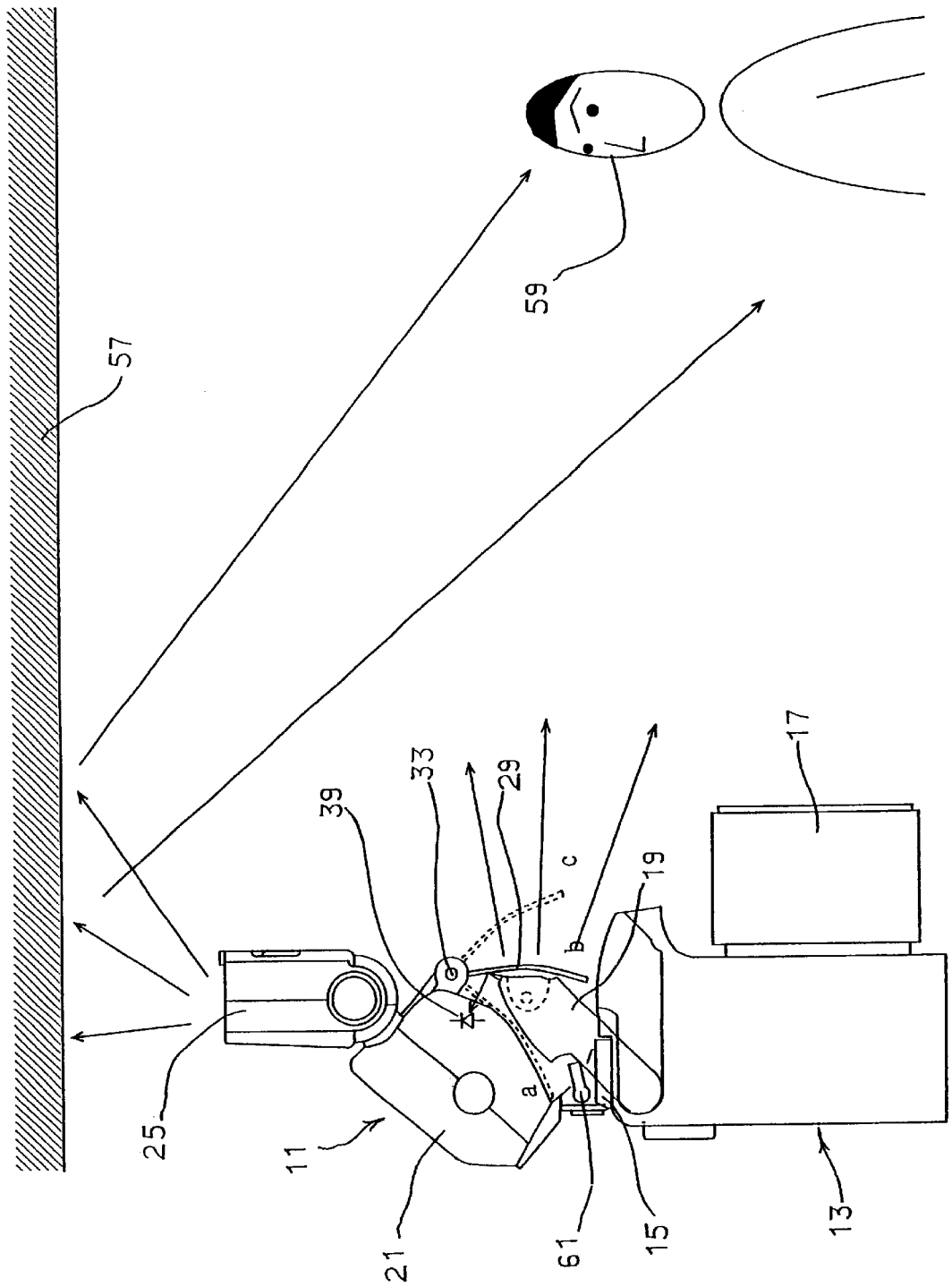
FIG. 8 is an explanatory view showing a state where a two-lamp-lighting photographing is carried out using a bounce light from the external flash device shown in FIG. 1 and a direct light.

FIG. 8 shows a two-lamp-lighting photographing in which a bounce light and a direct light are used.

In this state, the external flash device 11 is mounted on the mounting seat 15 of the camera 13. The luminescent unit 25 of the external flash device 11 is directed toward a bounce surface such as a ceiling 57. Therefore, it is a setting of an indirect illumination in which the subject 59 is illuminated by the reflected light. The internal flash device 19 is popped up to a position to be used for emitting light.

The dimming plate 29 of the external flash device 11 is set to cover the front of the light emitting window of the internal flash device 19. The dimming plate 29 has an effect of attenuating the light emission of the internal flash device 19 into about ¼ to ⅛ and, at the same time, diffusing the light. Incidentally, an attenuation in a range ½ to 1/16 is appropriate depending on the guide number of the internal flash device 19. When the camera 13 is released for photographing in this state, the internal flash device 19 and the external flash device 11 start light emission simultaneously.

The detecting lever 61 detects the pop-up of the internal flash device 19. The internal flash device 19 is popped up when it is used, turning the detecting lever 61 upward. Since the detecting lever 61 is connected with a pop-up detecting switch SW3, the pop-up detecting switch SW3 is turned ON when the detecting lever is turned upward. The display image of the LCD display panel 37 is changed according to a signal from the pop-up detecting switch SW3.

The luminescent unit 25 of the external flash device 11 is turned upward for a bounce photographing. In this state, a not-shown bounce light detecting switch SW4 is turned ON. The bounce detecting switch SW4 is turned ON when the luminescent unit 25 turns upward by a predetermined angle or more from a horizontal state. The display image of the LCD display panel 37 is changed by a signal from the bounce detecting switch SW4.

The reflected light from the subject 59 which is properly illuminated by both the bounce light and the direct light from the internal flash device 19 is measured through the photographing lens 17 by the camera 13, and the camera 13 terminates the light emission of the internal flash device 19 when the light amount reaches a predetermined value. At the same time, the camera 13 sends an emission termination signal to the external flash device 11 so that the external flash device 11 terminates light emission and thereby a picture is taken with a proper exposure.

The role of the dimming plate 29 in this state is described below.

As shown in FIG. 8, the dimming plate 29 held in the external flash device 11 is pivotally supported by the left and the right supporting members 31. The dimming plate 29 is held in a holding position "a" when it is not in use. When it is in use, the dimming plate 29 is turned forward and set at the position c, and then the internal flash device 19 built in the camera 13 is popped up to a position for use of light emission and is set at a position b in front of the internal flash device 19 as shown by the solid lines in FIG. 8.

The dimming plate 29 is fixed on the supporting member 31 with an appropriate friction in the rotational direction around the axis part 33 so that it can be fixed at an appropriate position even if the position of the light emission window of the internal flash device 19 is moved back and forth or vertically according to the model of the camera 13 which is used in combination with the external flash device 11.

Figure 9:
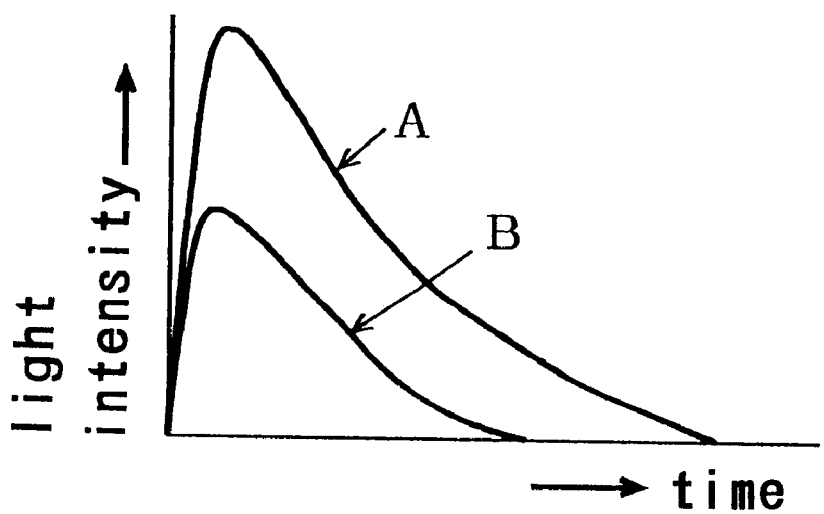
FIG. 9 is an explanatory view showing changes over time in intensity of light emissions from the external flash device and the internal flash device shown in FIG. 1.

FIG. 9 shows how the emitted light intensity of the external flash device 11 and the internal flash device 19 changes as time elapses. "A" is the intensity of the light emitted directly from the luminescent unit 25 of the external flash device 11, and B is the intensity of the light emitted directly from the internal flash device 19.

Figure 10:
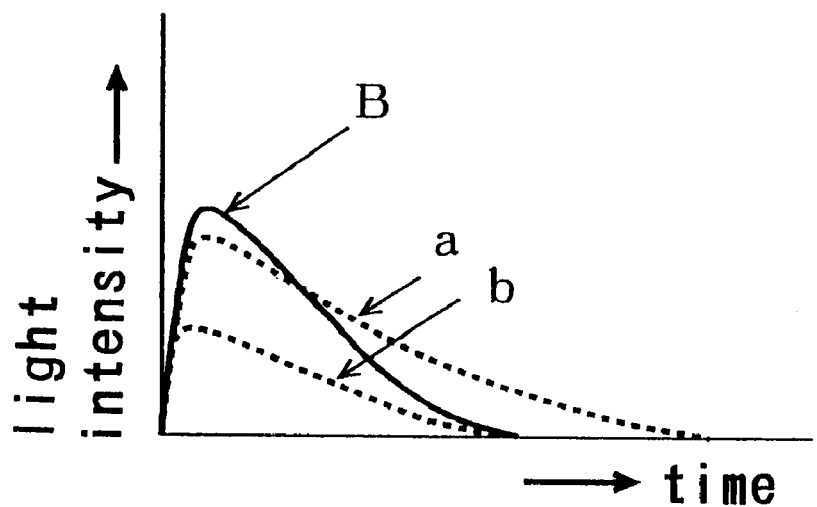
FIG. 10 is an explanatory view showing changes over time in illuminating intensity on a subject by the lights from the external flash device and the internal flash device shown in FIG. 1.

FIG. 10 shows the change in the intensity of the lights from the external flash device 11 and from the internal flash device 19 which illuminate the subject 59, as time elapses. "a" is the illuminating intensity of the light which is emitted from the luminescent unit 25 of the external flash device 11, bounced by the ceiling 57 and illuminating the subject 59, and b is the illuminating intensity of the light which is emitted from the internal flash device 19, dimmed by the dimming plate 29 and illuminating the subject 59.

Incidentally, the effect of bounce photographing is little obtained if the subject 59 is illuminated directly by the internal flash device 19 without using the dimming plate 29 because the external flash device 11 illuminates the subject 59 with the light weakened by bouncing (FIG. 10a) and the subject 59 is mainly illuminated by the light from the internal flash device 19 (FIG. 10B). In this case, the photographed image becomes unnatural without shadows just like the image photographed only with the illumination by the internal flash device 19. It is clear that the problem becomes more noticeable in the case that the subject 59 is close and an automatic exposure control function is used to obtain a proper exposure because the external flash device 11 and the internal flash device 19 of the camera 13 terminate light emission simultaneously in a short time.

In order to resolve the problem, the internal flash device 19 is covered with the dimming plate 29 so that the light from the internal flash device 19 illuminating the subject 59 is diffused and dimmed (FIG. 10b). As a result, the bounce light mainly illuminates the subject 59 from above while the weak light from the internal flash device 19 illuminates the subject 59 from the front supplementally, and thereby a so-called two-lamp bounce lighting is realized even when a photographing is carried out with an automatic exposure control. This method is an ideal lighting in which natural shadows are made in the lower area by the bounce light and the shadow area in which gradation is lost is adequately illuminated by the weak light from the front. The method is especially effective for taking a portrait because natural shadows are made and a catchlight is given to the eyes.

It is needless to say that the external flash device 11 of the present invention can operate, even when the camera 13 is using the internal flash device 19, by receiving the light emission start signal and the light emission terminating signal which is generated by a TTL automatic exposure control function, if those signals are transmitted to the external flash device 11 through the mounting seat 15.

However, when the camera 13 is of a certain type, it does not output the light emission start signal to the X-contact of the mounting seat 15 when the internal flash device 19 is popped up for use. The external flash device 11 cannot emit light when it is mounted on such cameras 13. Therefore, a light sensor 39 is provided on the front surface of the external flash device 11 opposing to the dimming plate 29 so that the sensor 39 receives the light emitted from the internal flash device 19 and reflected by the dimming plate 29.

(Example of Handling 3)

Figure 11:
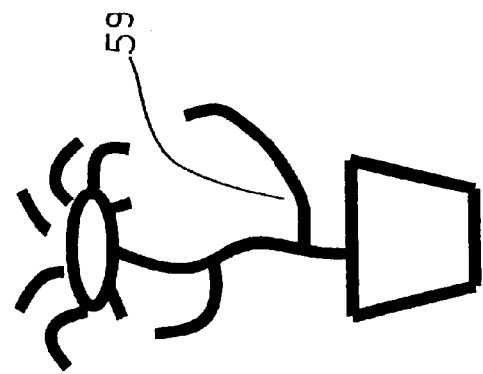
FIG. 11 is an explanatory view showing a state where a close-up photographing is being carried out using the external flash device shown in FIG. 1.
Figure 11:
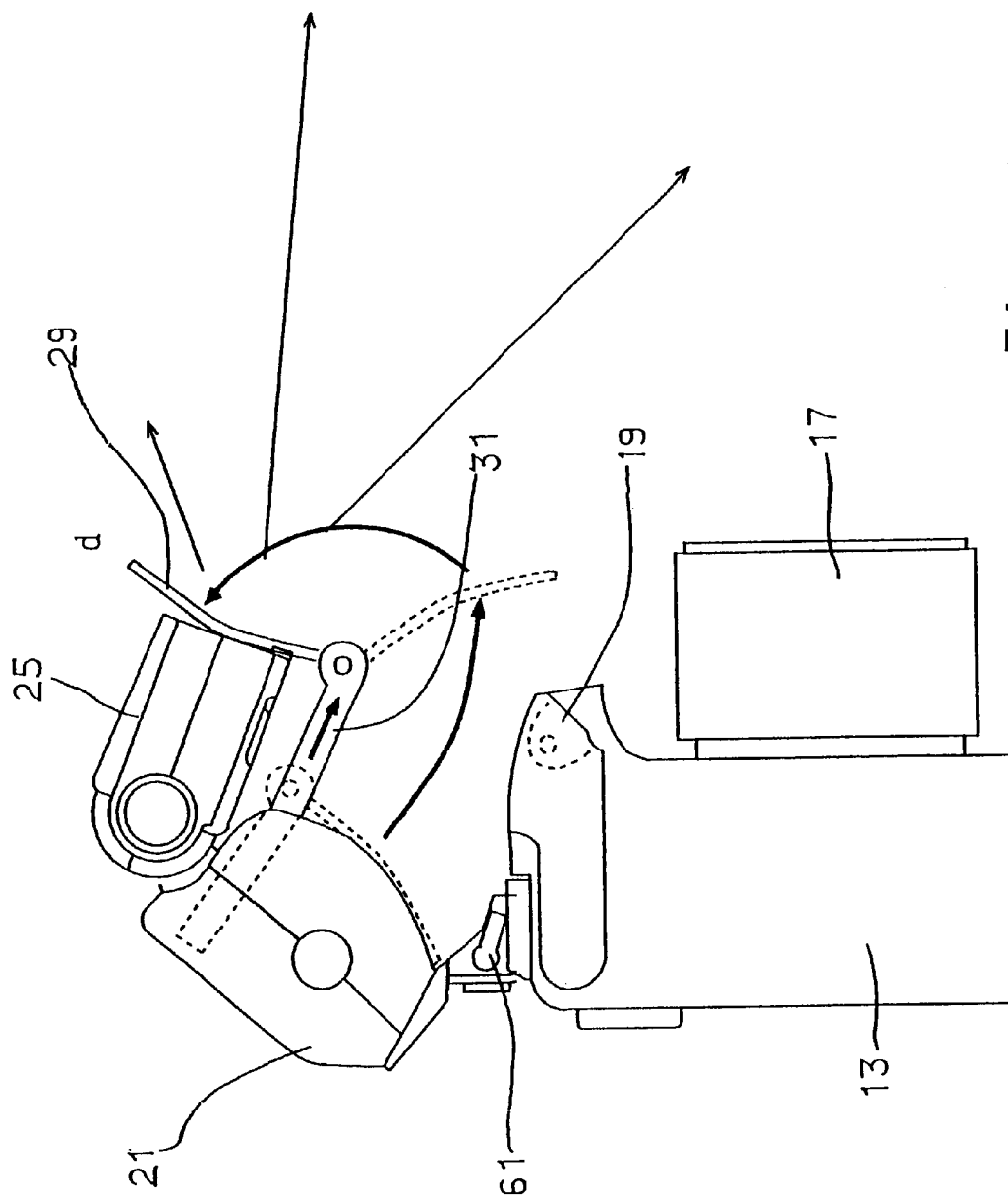

FIG. 11 shows a state in which a close-up photographing is carried out.

In this state, the luminescent unit 25 of the external flash device 11 is set in a direction down to the subject 59. The dimming plate 29, together with the supporting member 31, is pulled out to the front, turned to the front surface of the luminescent unit 25 of the external flash device and fixed. When the camera 13 is released in this state, the external flash device 11 emits light but the light is diffused by the dimming plate 29, so that a broad area of the subject 59 is illuminated.

The illumination unevenness is eliminated on the taken picture because the diffused light illuminates broadly even if the optical axis of the photographing lens 17 and the optical axis of the external flash device 11 deviate from each other. Further, photographing with an automatic exposure control can be carried out at a shorter distance because the light intensity is dimmed. Furthermore, since the guide number of the external flash device 11 becomes small, there is not such a problem that the F-value for obtaining a proper exposure, which is calculated manually, becomes so large that the F-value is not available with the photographing lens 17.

Figure 12:
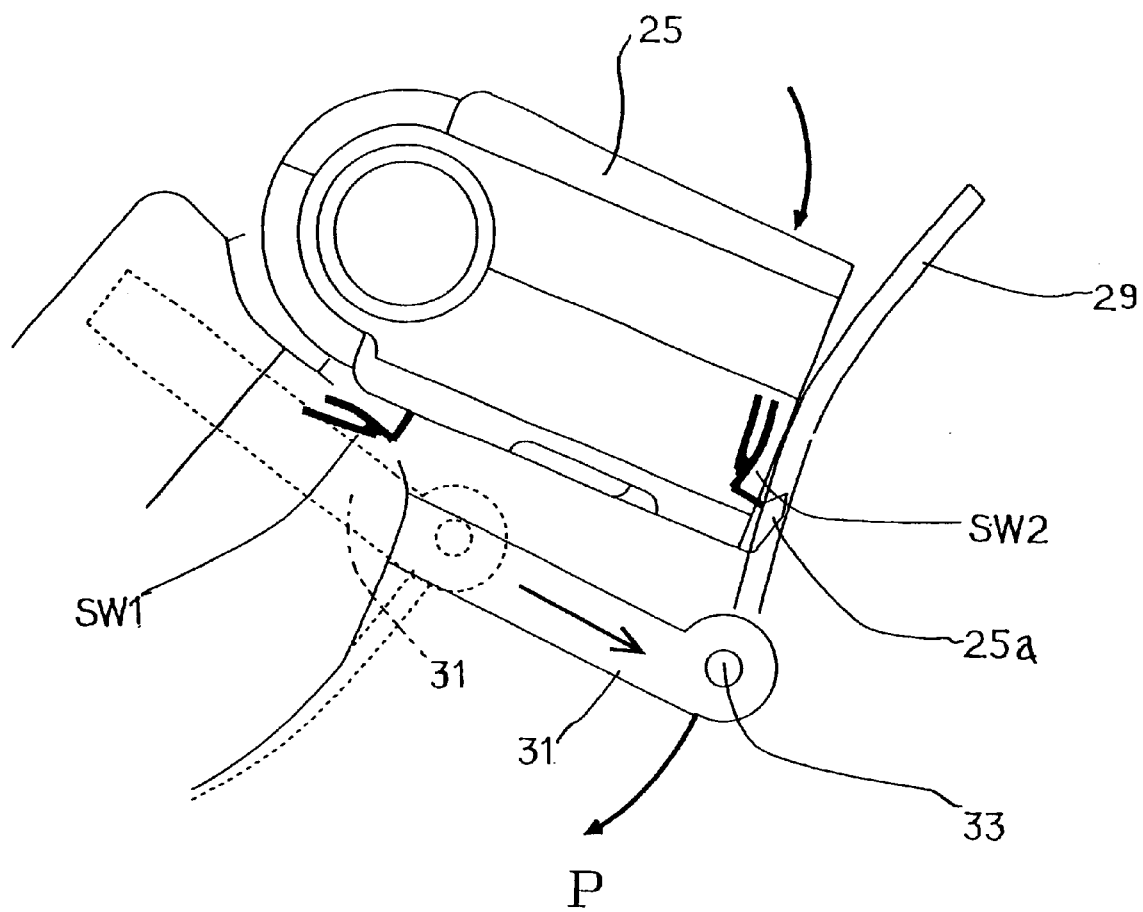
FIG. 12 is an enlarged explanatory view showing the external flash device shown in FIG. 11.

FIG. 12 is an enlarged view of the luminescent unit 25 and its neighborhood shown in FIG. 11.

The luminescent unit 25 of the external flash device 11 is turned downward to the close subject 59 to correct the parallax between the optical axis of the photographing lens 17 and that of the luminescent unit 25. The dimming plate 29 is hooked on a projection 25a projecting from the luminescent unit 25. The supporting member 31 is subjected to a moment in a direction (denoted by an arrow P) by a not-shown actuating member. Therefore, the dimming plate 29 is actuated downward to be hooked and fixed on the projection 25a.

When the luminescent unit 25 of the external flash device 11 is set downward, a lower detecting switch SW1 is turned ON. The lower detecting switch SW1 is turned OFF when the luminescent unit 25 is set in a horizontal direction or in an upward direction for a bounce position. When the dimming plate 29 is set in front of a dimming plate detecting switch SW2 built in the luminescent unit 25, the dimming plate detecting switch SW2 is pushed and turned ON. When the dimming plate 29 is not in front of the luminescent unit 25, the dimming plate detecting switch SW2 is turned OFF.

The dimming plate detecting switch SW2 may have a structure which turns ON when the supporting member 31 is pulled out because the dimming plate 29 is pulled out only when it covers the front of the luminescent unit 25 of the external flash device 11 for a close-up photographing.

FIG. 13B, FIG. 14B, FIG. 15B, FIG. 16B, FIG. 17B and FIG. 18B show information displayed on the LCD display panel 37 disposed on the back surface of the above described external flash device 11. The LCD display panel 37 displays images according to the setting of the external flash device 11 so that the two-lamp-lighting photographing or a close-up photographing is carried out without failure.

Figure 13A:
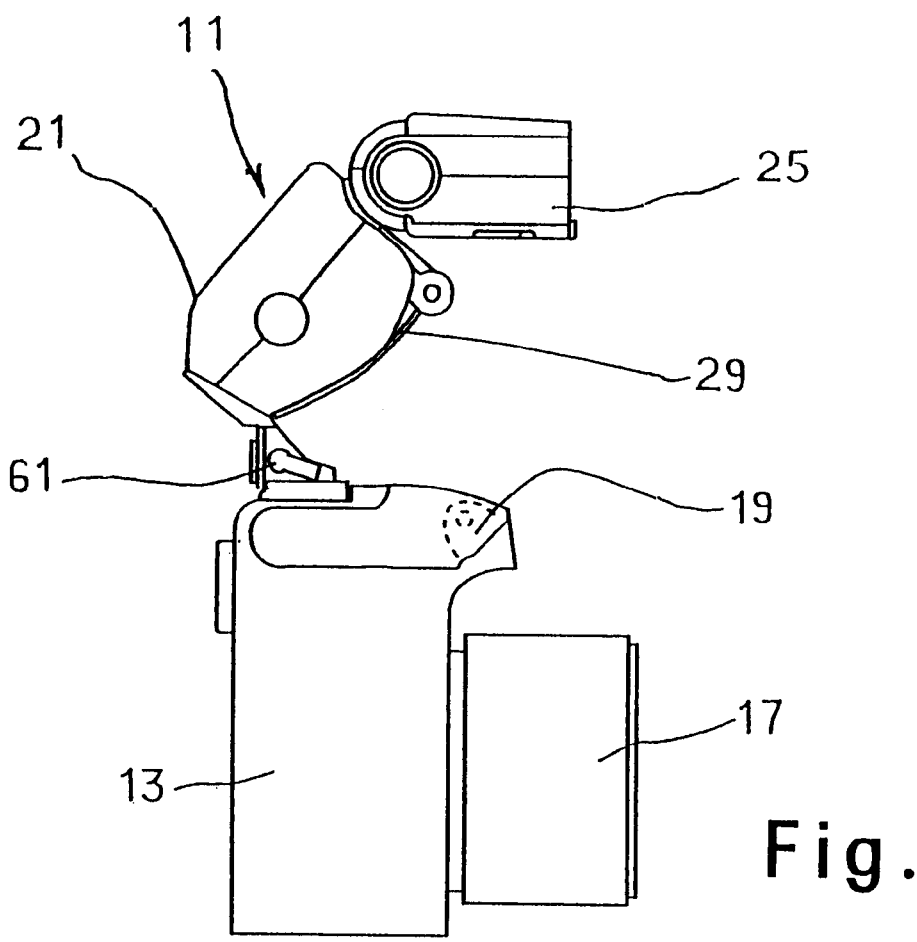
FIG. 13A is an explanatory view showing a state of the external flash device shown in FIG. 1.
Figure 13B:
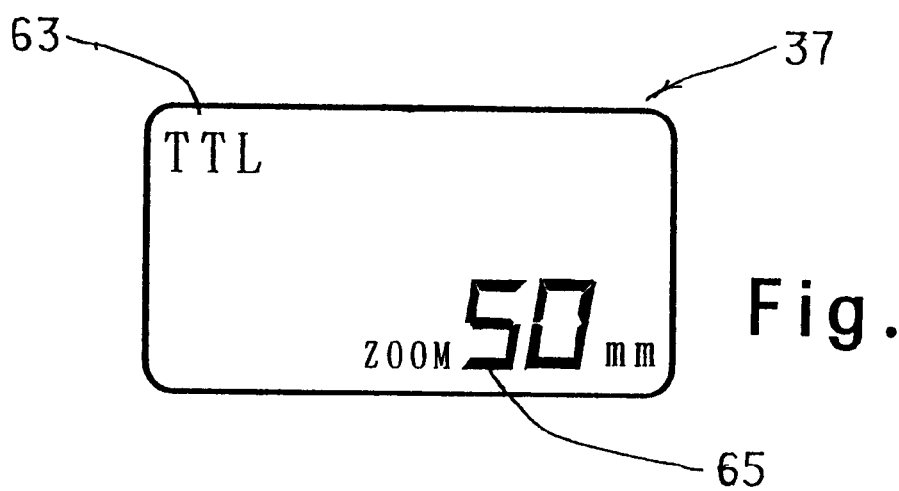
FIG. 13B is an explanatory view showing an example of an image displayed on a LCD display panel of the external flash device in the state shown in FIG. 13A.

The LCD display panel 37 in FIG. 13B indicates, as shown in FIG. 13A, that the photographing is carried out at a usual distance, in which the optical axis of the luminescent unit 25 of the external flash device 11 is parallel to the optical axis of the photographing lens 17. As the luminescent unit 25 is directed forward, the lower detecting switch SW1 is turned OFF and the bounce detecting switch SW4 is turned OFF. The pop-up detecting switch SW3 is turned OFF because the internal flash device 19 is not popped up. The dimming plate detecting switch SW2 is turned OFF because the dimming plate 29 is not set in front of the luminescent unit 25 of the external flash device 11.

In this case, symbols for indicating the position of the luminescent unit 25 of the external flash device 11, which will be described later, are not displayed. The symbol indicating that the internal flash device 19 is ready for use, which will be described later, is not displayed because the pop-up detecting switch SW3 is turned OFF, which means that the internal flash device 19 is not popped up. Therefore, the LCD image displayed on the LCD display panel 37 is as shown in FIG. 13B.

The display 63 indicates that the camera 13, to which the external flash device 11 is connected, is in the TTL automatic exposure control mode. The display 65 indicates that the focal length of the photographing lens 17 mounted on the camera 13 is 50 mm and the external flash device 11 is automatically set at an illuminating angle corresponding to the photographing angle.

Figure 14A:
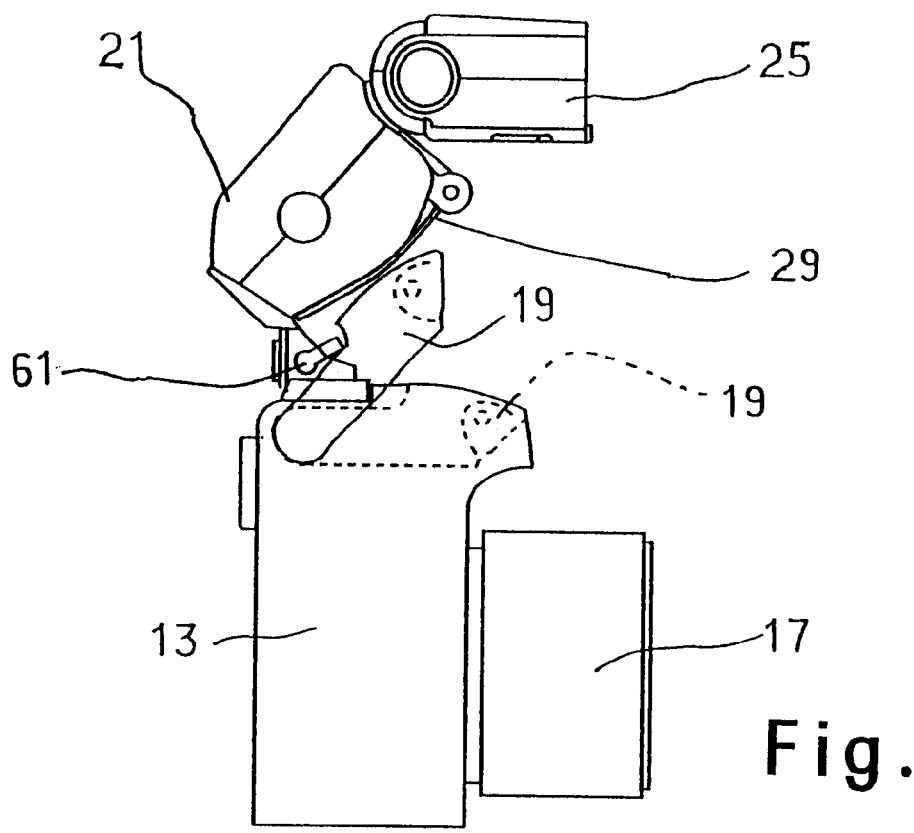
FIG. 14A is an explanatory view showing a state of the external flash device shown in FIG. 1.
Figure 14B:
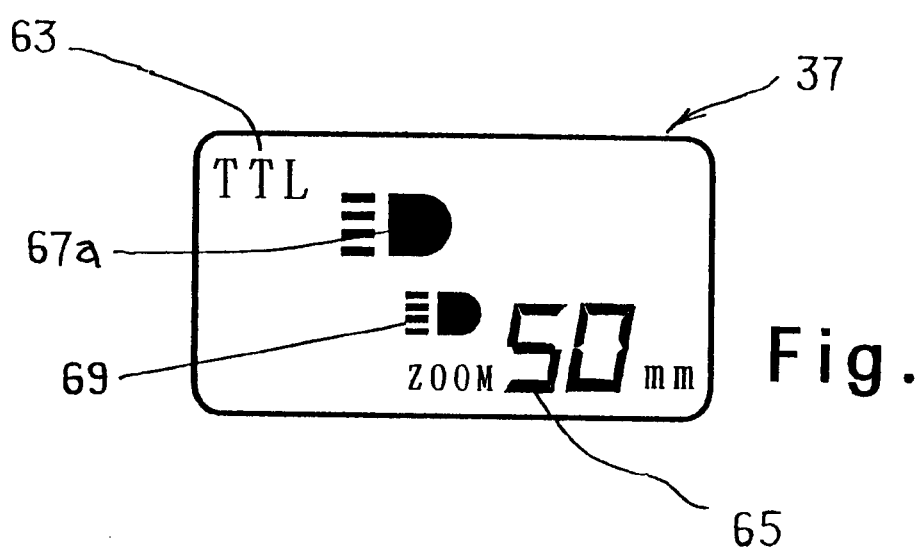
FIG. 14B is an explanatory view showing an example of the image displayed on the LCD display panel of the external flash device in the state shown in FIG. 14A.

The LCD display panel 37, as shown in FIG. 14B, indicates that the photographing is carried out at a usual distance in which the optical axis of the luminescent unit 25 of the external flash device 11 is parallel to the optical axis of the photographing lens 17, and this is the case that the photographer sets the internal flash device 19 ready for use and is going to photograph with a larger light amount.

As the luminescent unit 25 of the external flash device 11 is directed forward, the lower detecting switch SW1 is turned OFF and the bounce detecting switch SW4 is turned OFF. The pop-up detecting switch is turned ON because the internal flash device 19 is popped up. The dimming plate detecting switch SW4 is turned OFF because the dimming plate 29 is not set in front of the luminescent unit 25 of the external flash device 11.

In this case, the symbol 67a indicating the position of the luminescent unit 25 of the external flash device 11 and the symbol 69 indicating that the internal flash device 19 is ready for use are displayed. Both the symbols 67a and 69 indicate that light is emitted in a direction parallel to the optical axis of the photographing lens 17. Therefore, the image displayed on the LCD display panel 37 is as shown in FIG. 14B.

Figure 15A:
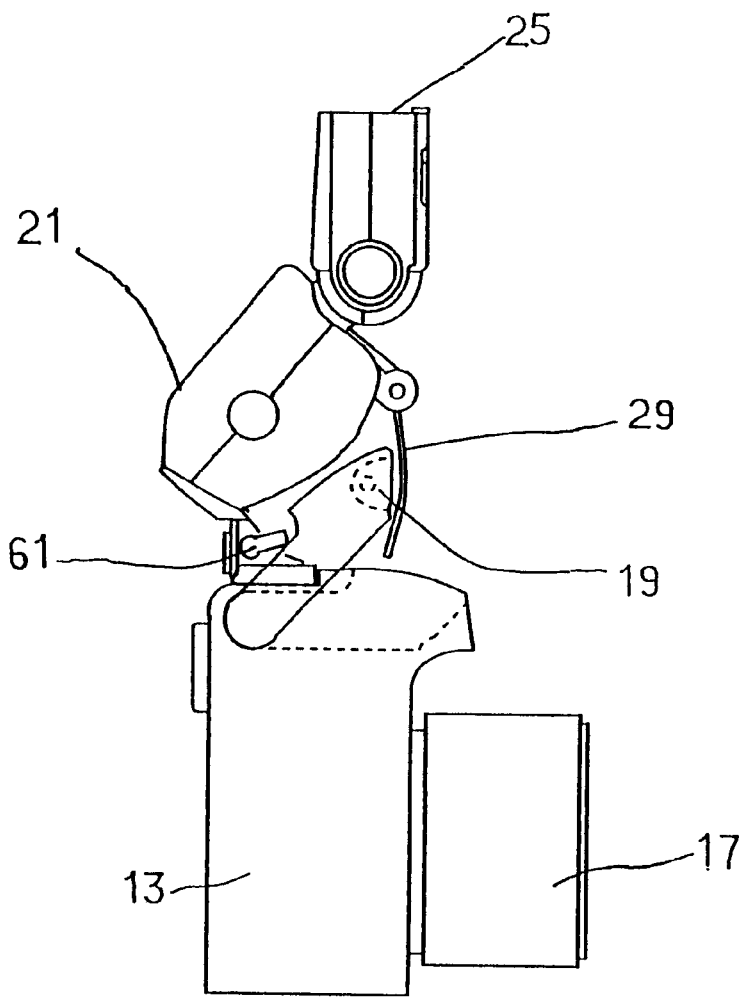
FIG. 15A is an explanatory view showing a state of the external flash device shown in FIG. 1.
Figure 15B:
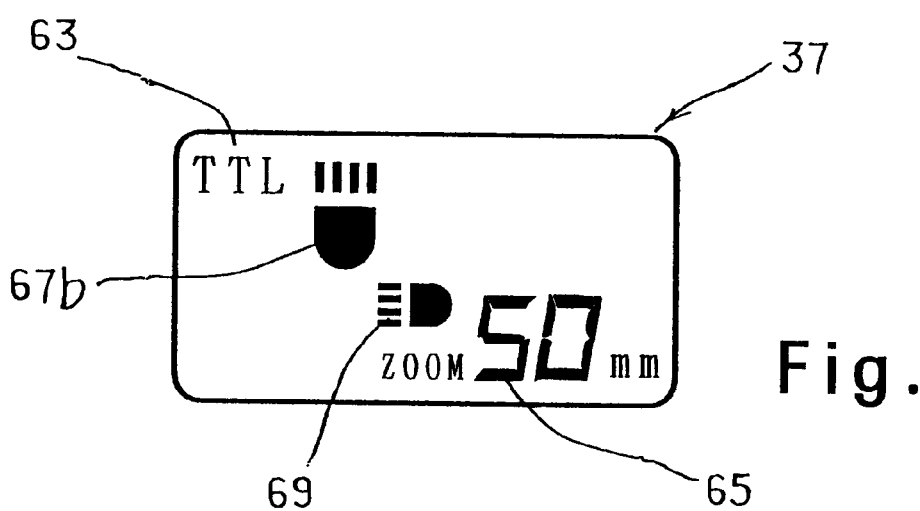
FIG. 15B is an explanatory view showing an example of the image displayed on the LCD display panel of the external flash device in the state shown in FIG. 15A.

The LCD display panel 37 shown in FIG. 15B indicates that the luminescent unit 25 of the external flash device 11 is in a bounce photographing mode as shown in FIG. 15A, and this is the case that the photographer sets the internal flash device 19 ready for use and is going to photograph using the internal flash device 19 as a supplementary light source.

As the luminescent unit 25 of the external flash device 11 is set for a bounce mode, the lower detecting switch SW1 is turned OFF and the bounce detecting switch SW4 is turned ON. The pop-up detecting switch SW3 is turned ON because the internal flash device 19 is popped up. The dimming plate detecting switch SW2 is turned OFF because the dimming plate 29 is not set in front of the luminescent unit 25 of the external flash device 11. In this case, a symbol 67b indicating the bounce position of the luminescent unit 25 of the external flash device 11 and the symbol 69 indicating that the internal flash device 19 is ready for use are displayed. Therefore, the image displayed on the LCD display panel 37 is as shown in FIG. 15B.

Figure 16A:
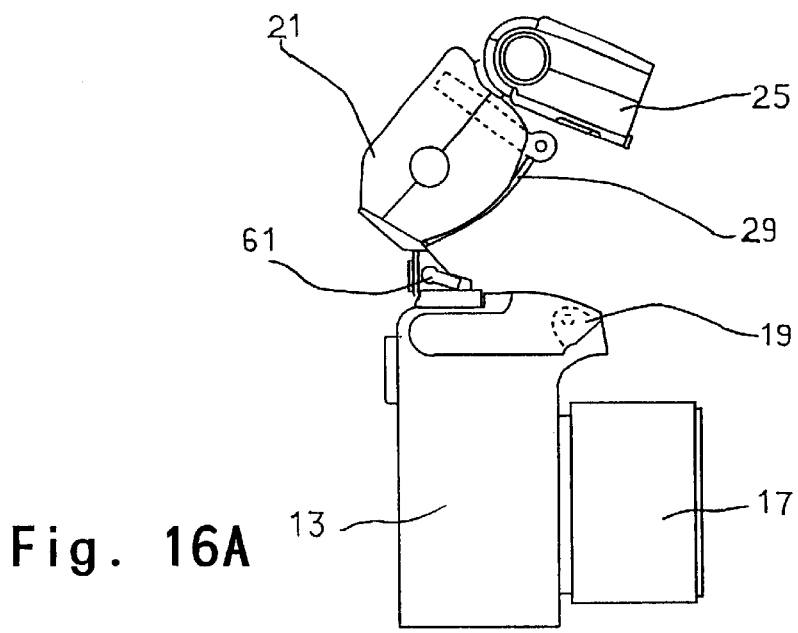
FIG. 16A is an explanatory view showing a state of the external flash device shown in FIG. 1.
Figure 16B:
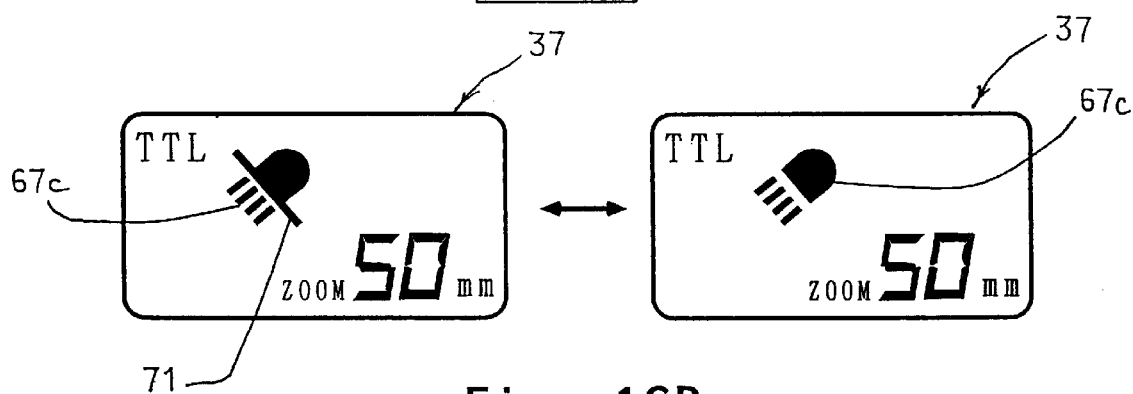
FIG. 16B is an explanatory view showing an example of the image displayed on the LCD display panel of the external flash device in the state shown in FIG. 16A.

The LCD display panel 37 shown in FIG. 16B indicates that the luminescent unit 25 of the external flash device 11 is directed downward to the optical axis of the photographing lens 17 for correcting the parallax as shown in FIG. 16A. The photographer does not use the internal flash device 19.

As the luminescent unit 25 of the external flash device 11 is set downward, the lower detecting switch SW1 is turned ON and the bounce detecting switch SW4 is turned OFF. The pop-up detecting switch SW3 is turned OFF because the internal flash device 19 is not popped up. The dimming plate detecting switch SW2 is turned OFF because the dimming plate 29 is not set in front of the luminescent unit 25 of the external flash device 11.

In this case, a symbol 67c indicating that the luminescent unit 25 of the external flash device 11 is directed downward is displayed. The symbol 69 is not displayed because the internal flash device 19 is not ready for use. Since the dimming plate 29 is not set in front of the luminescent unit 25 of the external flash device 11, which is not a desirable setting, the symbol 71 denoting the dimming plate 29 is blinking to express warning. Therefore, the symbol 71 blinks on the LCD display panel 37, and the LCD display panel 37 alternately displays the images for warning as shown in FIG. 16B.

Figure 17A:
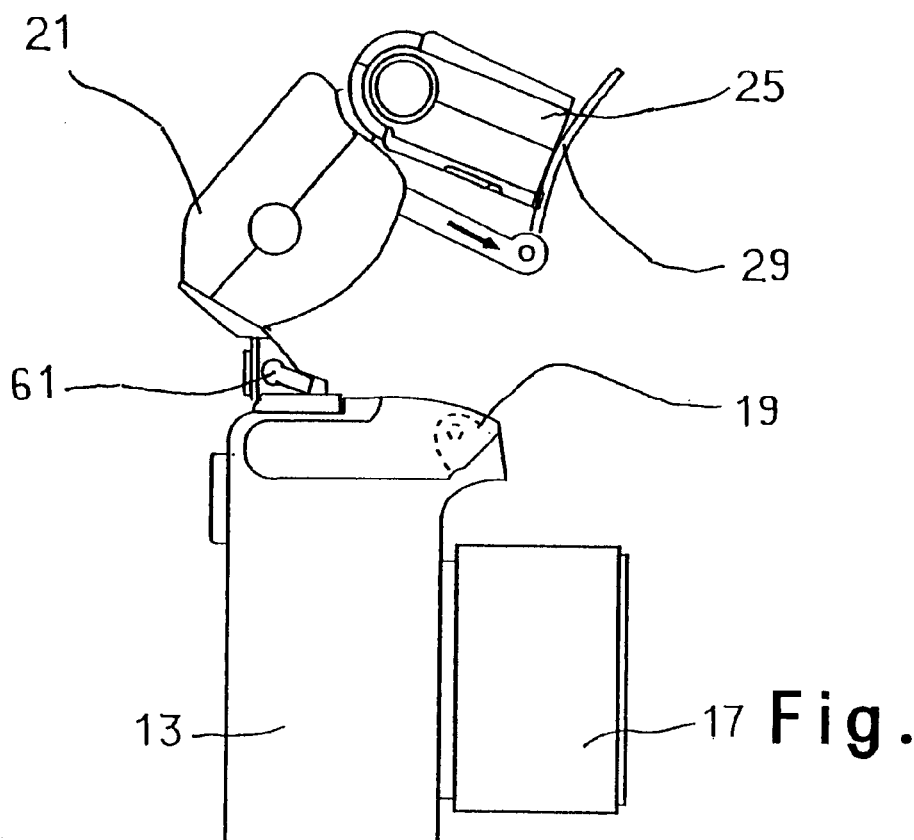
FIG. 17A is an explanatory view showing a state of the external flash device shown in FIG. 1.

FIG. 17A shows that the dimming plate 29 is set in front of the luminescent unit 25 of the external flash device in the condition shown in FIG. 16A. That is, it indicates that the luminescent unit 25 of the external flash device 11 is directed downward to the optical axis of the photographing lens 17 for correcting the parallax. The photographer does not use the internal flash device 19.

As the luminescent unit 25 of the external flash device 11 is set downward, the lower detecting switch SW1 is turned ON and the bounce detecting switch SW4 is turned OFF. The pop-up detecting switch SW3 is turned OFF because the internal flash device 19 is not popped up. The dimming plate detecting switch SW2 is turned ON because the dimming plate 29 is set in front of the luminescent unit 25 of the external flash device 11. In this case, the warning state shown in FIG. 16 is released.

Figure 17B:
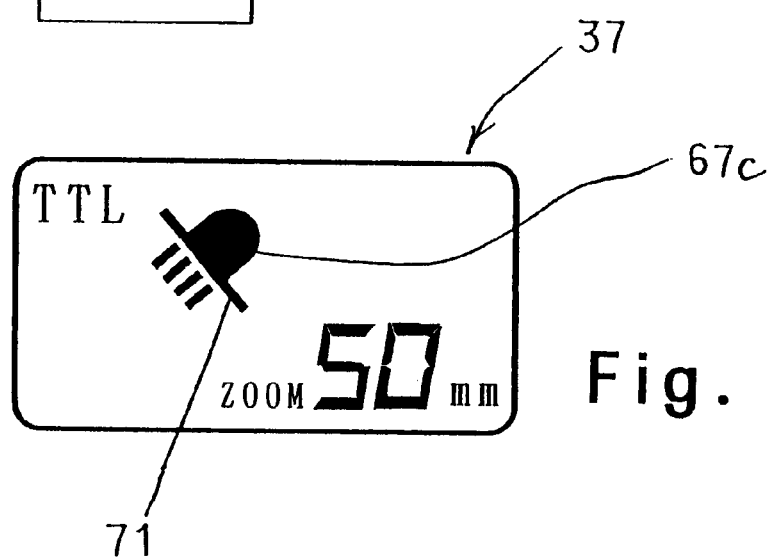
FIG. 17B is an explanatory view showing an example of the image displayed on the LCD display panel of the external flash device in the state shown in FIG. 17A.

Then, as shown in FIG. 17B, the symbol 67c indicating that the luminescent unit 25 of the external flash device 11 is directed downward is displayed. The symbol 69 is not displayed because the internal flash device 19 is not set ready for use. A symbol 71 of the dimming plate which indicates that the dimming plate 29 is set in front of the luminescent unit 25 of the external flash device 11 is displayed. Therefore, the display of the LCD display panel 37 is as shown in FIG. 17B.

Figure 18A:
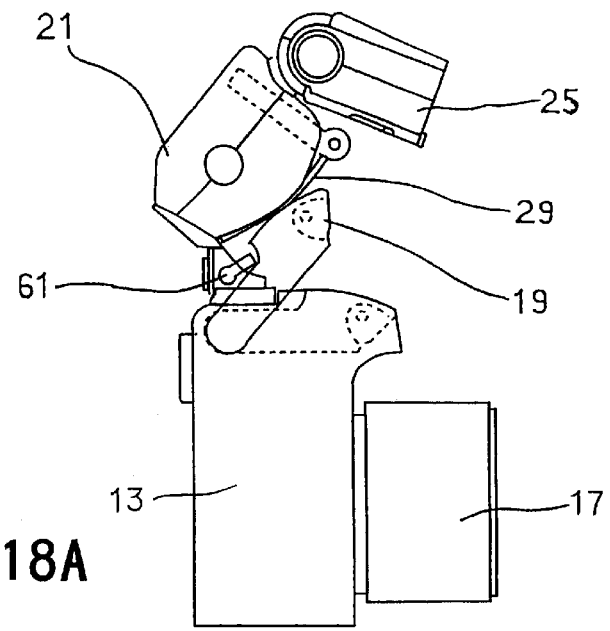
FIG. 18A is an explanatory view showing a state of the external flash device shown in FIG. 1.

FIG. 18A shows an undesirable setting which occurs in a close-up photographing carried out with the luminescent unit 25 of the external flash device 11 directed downward. It is in a photographing state in which the setting of the dimming plate 29 in front of the luminescent unit 25 is forgotten while the luminescent unit 25 is set downward. In addition, the internal flash device 19 is set ready for use (popped-up state) although it is a close-up photographing.

If the internal flash device 19 is used in a close-up photographing, it often occurs that insufficient light is supplied to the lower area of the image or that a shadow of the top of the photographing lens 17 is photographed in the image. In this case, the luminescent unit of the external flash device 11 is set downward to the lower portion of the photographing lens 17 but the dimming plate 29 is not set in front of the luminescent unit 29. The photographer pops up the internal flash device 19 for use. Therefore, the lower detecting switch SW1 is turned ON and the bounce detecting switch SW4 is turned OFF. The pop-up detecting switch SW3 is turned ON because the internal flash device 19 is popped up.

The dimming plate detecting switch SW2 is turned OFF because the dimming plate 29 is not set in front of the luminescent unit 25 of the external flash device 11.

Figure 18B:
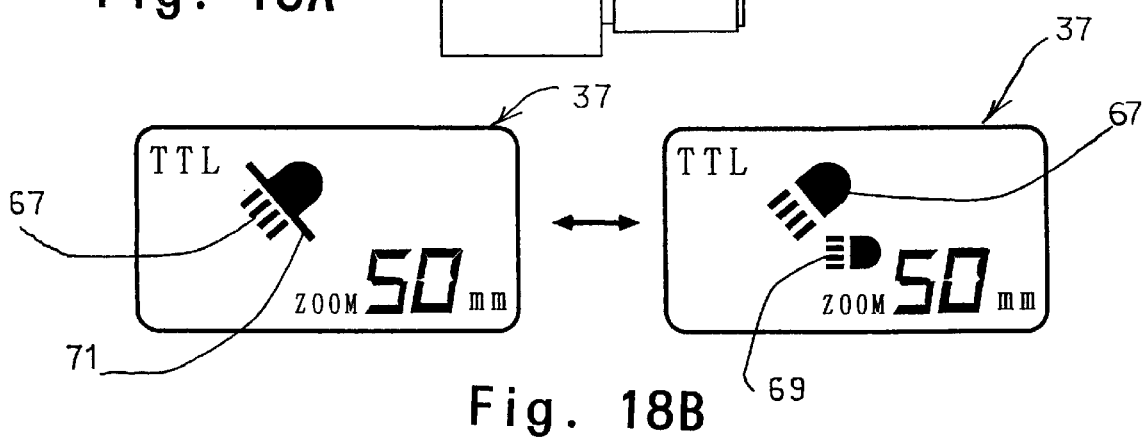
FIG. 18B is an explanatory view showing an example of the image displayed on the LCD display panel of the external flash device in the state shown in FIG. 18A.

In this case, the symbol 67c indicating that the luminescent unit 25 of the external flash device 11 is directed downward is displayed as shown in FIG. 18B. Both the symbols, 69 and 71, are displayed with blinking for warning, the symbol 69 for indicating that the internal flash device 19 is ready for use and the symbol 71 for indicating that the dimming plate 29 is not set. Therefore, the LCD display panel 37 displays warning alternately as shown in FIG. 18B.

In the above described external flash device 11, since the dimming plate 29 for dimming the light from the internal flash device 19 of the camera 13 is disposed on the body unit 21 of the external flash device 11 which is mounted for use on the mounting seat 15 of the camera 13, it becomes possible to carry out easily and reliably a two-lamp-lighting photographing which uses the light emission of the external flash device 11 as a main light source and the light emission of the internal flash device 19 of the camera 13 as a supplementary light source.

Further, the external flash device 11 can be provided at an inexpensive price because the two-lamp-lighting photographing becomes possible by providing only the dimming plate 29 in the external flash device 11.

Furthermore, by the external flash device 11 described above, the internal flash device 19 is reliably prevented from hitting the external flash device 11 when it pops up, for example, from the top of the camera 13 because the body unit 21 is disposed in such a manner that, when it is mounted on the mounting seat 15 of the mounting unit 23, it does not touch the internal flash device 19 which is ready for emitting light.

Further, the dimming plate 29 can be set easily and reliably at a proper position because the above-described external flash device 11 is provided in such a manner that the position of the dimming plate 29 relative to the body unit 21 is changeable.

Further, in the external flash device 11 described above, the dimming plate 29 can cover the front of the luminescent unit 25 of the external flash device 11 by, for example, pulling out the supporting member 31 from the body unit 21 because the dimming plate 29 is disposed at an end of the supporting member 31 which is retractably housed in the body unit 21.

Further, by the above described external flash device, other than the two-lamp-lighting photographing, a close-up photographing can be carried out easily and reliably using only the external flash device 11 because the dimming plate 29 is made movable to the front of the luminescent unit 25 or to the front of the internal flash device selecting either the luminescent unit 25 or the internal flash device 19.

Further, when the camera 13 is of a certain type, it does not transmit the light emission start signal to the external flash device 11 during the use of the internal flash device 19. However, the two-lamp-lighting photographing can be realized for such camera 13 by detecting the reflected light from the dimming plate 29 by the sensor 39.

Furthermore, the external flash device described above can be easily handled because it automatically detects and displays the position of the luminescent unit 25, use/no use of the internal flash device 19 and the setting of the dimming plate 29, and also displays adequate warnings for incorrect settings.

Figure 19:
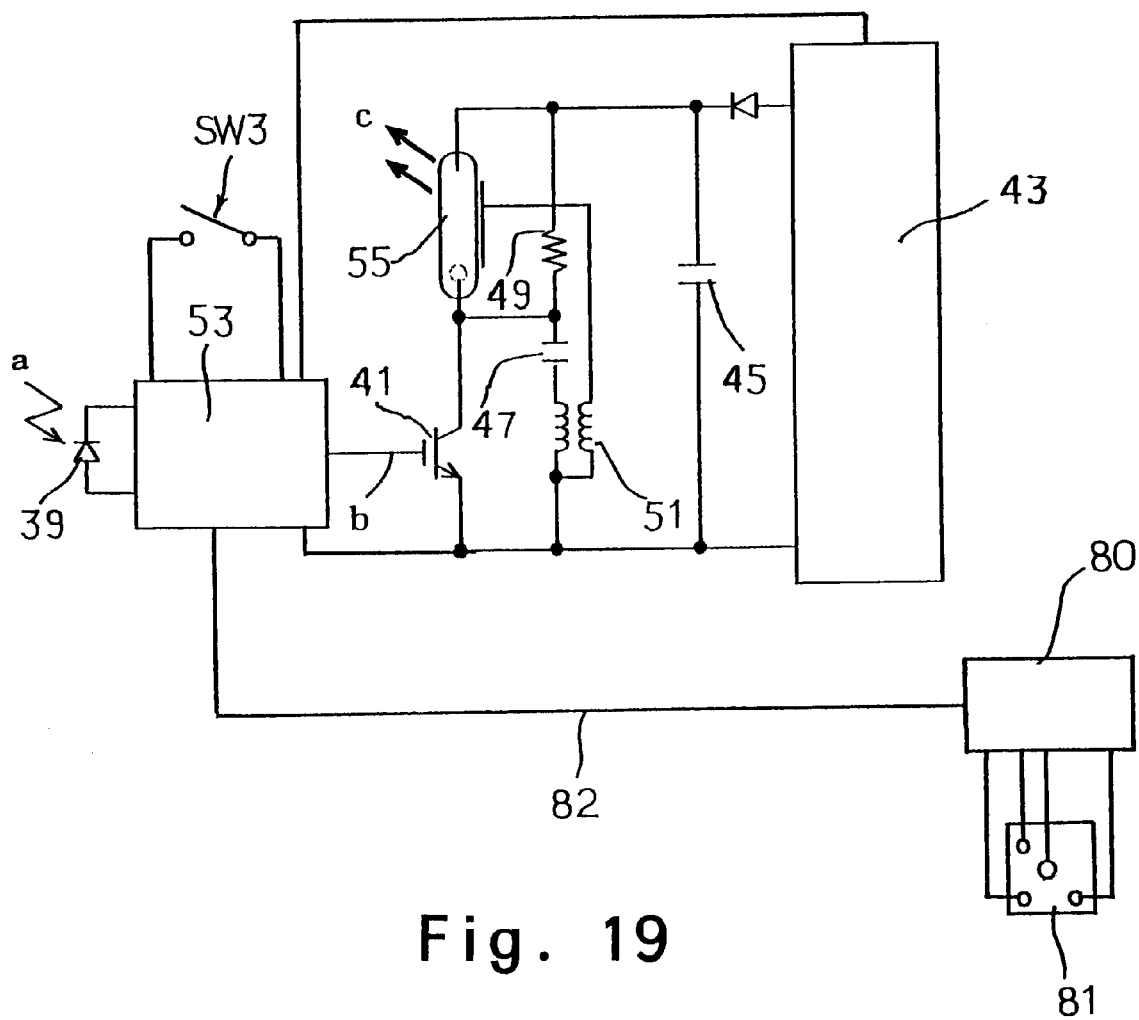
FIG. 19 is a circuit diagram showing another embodiment of the electric circuit of the external flash device.

FIG. 19 shows an embodiment in which the slave circuit shown in FIG. 6 can be automatically switched to the known slave circuit which can respond to a distant flash device. In the slave circuit shown in FIG. 6, the sensitivity of the circuit 53 is lowered so that it responds only to the light emission of the internal flash device 19 of the camera 13 to which the external flash device 11 is mounted without responding to other flash devices.

In the circuit shown in FIG. 19, a camera interface circuit 80 is provided to distinguish the signals sent from a plurality of electric contacts of the mounting unit 81 to be mounted on the mounting seat of the camera, or its connection to the camera. The camera interface circuit 80 sends or receives information required for flash photographing by mutual digital communication when both the power supplies of the camera and of the external flash device are ON. Whether or not the external flash device is mounted on the mounting seat of the camera is distinguishable even when the power supply of the camera is OFF.

The camera interface circuit 80 outputs a high level to the circuit 53 through the output 82 when the external flash device 11 is mounted on the mounting seat of the camera, while it outputs a low level to the circuit 53 through the output 82 when the external flash device is removed from the mounting seat of the camera.

The circuit 53 decides that the external flash device is mounted on the camera when the output 82 is high, and operates as a slave circuit having low receiving sensitivity when the pop-up switch SW3 is turned ON according to the pop-up of the internal flash device.

On the other hand, the circuit 53 decides that the external flash device is removed from the camera when the output 82 is low, and operates as a conventional slave circuit having increased receiving sensitivity when the slave operation is set by a not-shown switch. The pop-up detecting switch SW3 operates differently as described below when the output 82 is low.

When the output 82 is low, since the external flash device is not mounted on the mounting seat of the camera, the pop-up detecting switch SW3 is not required to detect the pop-up of the internal flash device. A case is assumed that a slave photographing is carried out with a camera held by one hand (usually a right hand), with the external flash device held by another hand (usually a left hand) and with no cord connecting the camera and the external flash device.

When the camera is released and the internal flash device built in the camera emits light, the external flash device emits light simultaneously owing to the slave mechanism. At the time, the slave circuit of the external flash device may respond to a light other than the light from the internal flash device of the photographer's camera because the slave circuit of the external flash device simply duplicates the start and the stop of the light emission of other flash light emitting circuits. Such an erroneous operation may occur especially when there are other photographers near the camera.

Therefore, the circuit 53 is structured in such a manner that, when the output 82 of the camera interface circuit 80 is low, the detecting lever 61, which composes the pop-up detecting switch SW3, can be turned by the photographer's finger, turning the pop-up detecting switch SW3 ON, so that the slave emission is prevented. The slave emission is enabled only when the photographer's finger is released at his own photographing timing and to release the camera. Thus, the slave emission in synchronization with emission of other flashing device is prevented and a conventional slave photographing is made possible, in which receiving sensitivity is increased in accordance with the photographer's own photographing timing.

The present invention has been heretofore described in detail but the above described embodiments and the modifications are just the examples of the present invention, and the present invention is not limited to those embodiments and modifications. It is clear that various changes may be made in the embodiments without departing from the spirit of the present invention.

What is claimed is:

1. A detachable flash device being detachably mounted for use on the mounting seat of a camera having a built-in flash device, the detachable flash device comprising a dimming plate for dimming light emitted from the built-in flash device, by covering a luminescent unit of the built-in flash device when the detachable flash device is attached to the mounting seat of the camera.

2. A detachable flash device, comprising:
   a mounting unit to be detachably mounted on a mounting seat of a camera having a built-in flash device;
   a body unit being connected with said mounting unit;
   a first luminescent unit being connected with said body unit; and
   a dimming plate being disposed on said body unit and capable of dimming light emitted from a second luminescent unit of the built-in flash device when the mounting unit is mounted on the mounting seat of the camera.

3. The detachable flash device according to claim 2, wherein:
   said built-in flash device is disposed so as to be able to pop up, and said body unit is disposed so as not to come in contact with the built-in flash device when said mounting unit is mounted on the mounting seat of the camera and the built-in flash device pops up from the camera.

4. The detachable flash device according to claim 2, wherein said dimming plate is disposed to be able to change its position relative to said body unit.

5. The detachable flash device according to claim 4, further comprising a supporting member being disposed retractably in said body unit, and wherein said dimming plate is disposed at one end of said supporting member.

6. The detachable flash device according to claim 4, wherein said dimming plate, when the mounting unit is mounted on the mounting seat, selects one of said first luminescent unit and said second luminescent unit and moves to the front of said first luminescent unit or to the front of said second luminescent unit.

7. The detachable flash device according to claim 3, further comprising a detecting device for detecting a pop-up of the built-in flash device when said built-in flash device is popped up and when said mounting unit is mounted on the mounting seat.

8. The detachable flash device according to claim 7, further comprising a display device for displaying that the built-in flash device is in a pop-up state when a pop-up of the built-in flash device is detected by said detecting device.

9. The detachable flash device according to claim 7, further comprising a slave device for enabling detection of light emission from the built-in flash device when the pop-up of the built-in flash device is detected by said detecting device, and for illuminating said first luminescent unit in response to an illumination of said built-in flash device.

10. The detachable flash device according to claim 2, further comprising a slave device for detecting light emission of the built-in flash device or other flash devices, and for illuminating said first luminescent unit in response to an illumination of said built-in flash device, wherein said slave device sets sensitivity in receiving light emitted from said built-in flash device or any other type of flash devices at a lower level when said mounting unit is mounted on the mounting seat of the camera than when said mounting unit is not mounted on the mounting seat of the camera.

11. The detachable flash device according to claim 10, further comprising a control member being controlled to enable or disable emission from the first luminescent unit by said slave device, when said mounting unit is not mounted on the mounting seat of the camera.

* * * * *